(12) United States Patent
Liebing et al.

(10) Patent No.: US 6,479,563 B1
(45) Date of Patent: Nov. 12, 2002

(54) RADIATION—AND/OR HEAT-CURABLE ADHESIVE HAVING HIGH THERMAL CONDUCTIVITY

(75) Inventors: Gerhard Liebing, Stuttgart; Volker Brielmann, Waiblingen; Achim Battermann, Eschborn; Juergen Perl, Oberursel, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,402

(22) PCT Filed: Apr. 15, 1999

(86) PCT No.: PCT/DE99/01124

§ 371 (c)(1),
(2), (4) Date: Jan. 30, 2001

(87) PCT Pub. No.: WO99/54423

PCT Pub. Date: Oct. 28, 1999

(30) Foreign Application Priority Data

Apr. 17, 1998 (DE) .......................................... 198 17 193

(51) Int. Cl.[7] .......................... C09J 175/16; C09J 4/06; C08J 3/28
(52) U.S. Cl. ............................. 522/13; 522/24; 522/81; 522/83; 522/96; 522/173; 523/223; 524/783; 524/786; 524/787; 524/789; 156/275.5; 156/275.7; 156/331.7
(58) Field of Search .............................. 428/355 R, 356, 428/355 N, 355 AC; 522/13, 24, 81, 83, 96, 173, 42, 64, 50; 523/223; 524/783, 786, 787, 789; 156/275.5, 275.7, 331.7

(56) References Cited

U.S. PATENT DOCUMENTS

| 4,574,138 A | * | 3/1986 | Moran et al. ................ 523/176 |
| 4,855,002 A | * | 8/1989 | Dunn et al. |
| 4,892,606 A | * | 1/1990 | Miyazaki et al. ........ 156/275.5 |
| 5,395,269 A | * | 3/1995 | Koblitz et al. |

FOREIGN PATENT DOCUMENTS

| DE | 44 41 414 | 6/1995 |
| EP | 0 474 194 | 3/1992 |
| EP | 0 566 093 | 10/1993 |
| JP | 6085896 | 3/1994 |

* cited by examiner

*Primary Examiner*—Susan W. Berman
(74) *Attorney, Agent, or Firm*—Kenyom & Kenyon

(57) ABSTRACT

A radiation—and/or heat-curable adhesive with high thermal conductivity includes the following recipe:

- 19 to 40 wt % of a difunctional acrylated, aromatic polyurethane;
- 9 to 25 wt % of (2-hydroxypropyl) acrylate or methacrylate;
- 1 to 5 wt % of one or more photoinitiators;
- 35 to 70 wt % of one or more mineral fillers;
- 0.5 to 3 wt. % of an $SiO_2$-containing thixotropizing agent; and
- 0.5 to 2 wt % of an organic peroxide.

13 Claims, No Drawings

RADIATION— AND/OR HEAT-CURABLE ADHESIVE HAVING HIGH THERMAL CONDUCTIVITY

BACKGROUND OF THE INVENTION

1. Field of the Invention

The present invention relates to a radiation—and/or heat-curable adhesive having high thermal conductivity.

2. Description of Related Art

Adhesives of the generic type mentioned above are commercially available. However, they do not have a satisfactory combination of properties. For example, their thermal conductivity is less than 0.7 W/mK, which is considered to be too low. Their long-term service temperature, which is below 160 degrees Celsius, is also considered to be too low. Furthermore, the radiation-cured adhesives known according to the related art have the disadvantage that they have a wet surface after curing. Atmospheric oxygen does not produce polymerization on the adhesive surface, as opposed to the remaining adhesive mass, which means that monomers remain there and do not undergo a complete reaction, which results in surface wetness.

Silicone gels are regularly applied to electric circuitry to protect them. Due to the manufacturing process used, these gels usually contain a platinum complex as the catalyst. The gelling of the gel as it comes into contact with the adhesive can inhibit the silicon gel at the boundary layer.

The thermal conductivity of a radiation—and/or heat-curable adhesive depends, in particular, on the concentration of the mineral filler contained in the adhesive, with the thermal conductivity rising as the filler concentration increases. However, too high an adhesive filler concentration inhibits radiation curing of the resin. In the adhesives known from the related art, the mineral filler concentration is less than 50 wt %, which does not result in a satisfactory thermal conductivity.

SUMMARY OF THE INVENTION

The object of the present invention is therefore to provide a radiation-cured and/or thermally cured adhesive that overcomes the disadvantages of the related art and demonstrates clearly superior properties.

This object is achieved, according to the present invention, by providing a radiation—and/or heat-curable adhesive with high thermal conductivity that is characterized by an adhesive formula that includes 19 to 40 wt % of a difunctional acrylated, aromatic polyurethane; 9 to 25 wt % of (2-hydroxypropyl) acrylate or methacrylate; 1 to 5 wt % of one or more photoinitiators, 35 to 70 wt % of one or more mineral fillers; 0.5 to 3 wt % of an $SiO_2$-containing thixotropizing agent; and 0.5 to 2 wt % of an organic peroxide.

DETAILED DESCRIPTION OF THE INVENTION

In one preferred embodiment, the photoinitiator is 1-[4-(2-hydroxyethoxy)-phenyl]-2-hydroxy-2-ethyl-1-propane-1-one, bis(2,4,6-trimethyl benzoyl)phenyl phosphine oxide or 2-methyl-1-[4-(methylthio)phenyl]-2-morpholino-propanone-1.

In a further preferred embodiment, the mineral filler is $Al_2O_3$, AlN, BeO, BN, SiC, $Si_3N_4$, $TiO_2$, $SiO_2$, diamond, graphite, $BaSO_4$, GaAs or a mixture thereof. The mineral fillers used are thermally, yet not electrically, conductive mineral fillers.

In a further preferred embodiment, tert. butyl peroxy benzoate, methyl isobutyl ketone peroxide or dibenzoyl peroxide is used as the peroxide.

In a particularly preferred embodiment, the formula of the adhesive according to the present invention includes 21 to 28 wt % of a difunctional acrylated, aromatic polyurethane; 11 to 18 wt % of (2-hydroxypropyl) acrylate or methacrylate; 1 to 4 wt % of one or more photoinitiators, 50 to 65 wt % of one or more mineral fillers; 1 to 2.5 wt % of an $SiO_2$-containing thixotropizing agent; and 1 to 1.5 wt % of an organic peroxide.

A radiation—and/or heat-curable adhesive having high thermal conductivity, characterized in that its formula contains the following components, is particularly preferred:

23 to 26 wt % of a difunctional acrylated, aromatic polyurethane; 13 to 16 wt % of (2-hydroxypropyl) acrylate or methacrylate; 2 to 3 wt % of one or more photoinitiators, 52 to 60 wt % of one or more mineral fillers; 1 to 2 wt. % of an $SiO_2$-containing thixotropizing agent; and 1 to 1.5 wt % of an organic peroxide.

Actilane® 170, from Akcros Chemicals, can be used, for example, as the difunctional acrylated, aromatic polyurethane. The polyurethane used in this case has a relatively low molecular weight.

Known $SiO_2$-containing thixotropizing agents used according to the present invention include, for example, the known Aerosils® by Degussa.

The single-component adhesive according to the present invention makes it possible to bond electronic components or circuits to heat sinks in a particularly advantageous manner. Examples of electronic components are transistors, or integrated circuits. Examples of heat sinks are metal elements.

The particular advantage of the adhesive according to the present invention lies in a combination of multiple advantageous properties. Thus, it is suitable for a long-term service temperature of up to 180 degrees Celsius. In addition, its thermal conductivity is 0.7 to 1.2 W/mK. Its adhesive strength is greater than 10 N/mm² according to DIN EN 1465. Adhesive shrinkage is less than 6 wt% during radiation curing.

A particularly advantageous feature is that silicone gels with platinum catalysts are not inhibited when they come into contact with the adhesive. Furthermore, oxygen inhibiting does not occur on the adhesive surface during radiation and/or heat curing, which produces a dry surface. Unlike known adhesives according to the related art, it can be assumed that the monomers used are fully converted.

The adhesive according to the present invention is also characterized in that its applications are particularly flexible, since it is radiation-curable, heat-curable, and both radiation—and heat-curable. The novel adhesive is further characterized by particularly favorable processing characteristics. Thus, it can be punched and easily applied by screen printing. Furthermore, it is easy to dispense, i.e., it can be easily delivered, for example, by a needle jet.

In a further preferred embodiment, the adhesive is characterized in that it includes additional spherical spacers. The latter can be made of metal, plastic, glass, ceramic or a combination of these materials. Their diameter lies between 10 and 100 µm, preferably between 20 and 40 µm. Providing these spacers in the adhesive makes it possible to easily achieve a defined distance between the adhering parts.

The mineral filler particle size is less than 100 µm. It is preferably between 1 and 20 µm. The mineral filler particle size can determine the adhesive layer thickness.

The present invention is explained in greater detail on the basis of the following examples.

EXAMPLE 1

An adhesive is produced in the known manner according to the following formula:

23.39 wt % Actilane® 170
15.60 wt % (2-hydroxypropyl) methacrylate
1.17 wt % Irgacure® 651
0.78 wt % Trigonox® CM50
57.33 wt % Nabolox® No 115-25
1.48 wt % Aerosil® R202 and
0.25 wt % spacer Compared to adhesives with acrylate systems according to the related art, the new adhesive is characterized, in particular, by a significantly improved thermal conductivity, a much higher thermal stability, and a better chemical stability.

EXAMPLE 2

An adhesive is produced in the known manner according to the following formula:

35.92 wt % Actilane® 170
23.95 wt % (2-hydroxypropyl) methacrylate
35.93 wt % Barium sulfate
1.80 wt % Irgacure® 651
1.20 wt % Trigonox® MC50 and
1.20 wt % Aerosil® TS100

The novel adhesive is characterized, in particular, by a very good chemical stability.

What is claimed is:

1. A radiation—and/or heat-curable adhesive composition having high thermal conductivity, comprising: 19 to 40 wt % of a difunctional acrylated, aromatic polyurethane; 9 to 25 wt % of (2-hydroxypropyl) acrylate or methacrylate; 1 to 5 wt % of one or more photoinitiators; 35 to 70 wt % of one or more mineral fillers; 0.5 to 3 wt. % of an $SiO_2$-containing thixotropizing agent; 0.5 to 2 wt % of an organic peroxide; and spherical spacers.

2. The adhesive composition according to claim 1, wherein the photoinitiator is 1-[4-(2-hydroxyethoxy)-phenyl]-2-hydroxy-2-ethyl- 1-propane- 1-one, bis(2,4,6-trimethyl benzoyl)phenyl phosphine oxide or 2-methyl-1-[4-(methylthio)phenyl]-2-morpholino-propanone-1.

3. The adhesive composition according to claim 1, wherein the mineral filler is selected from the group consisting of $Al_2O_3$, AlN, BeO, BN, SiC, $Si_3N_4$, $TiO_2$, $SiO_2$, diamond, graphite, $BaSO_4$, and GaAs and mixtures thereof.

4. The adhesive composition according to claim 1, wherein the organic peroxide is tert. butyl peroxy benzoate, methyl isobutyl ketone peroxide or dibenzoyl peroxide.

5. The adhesive composition according to claim 1, comprising: 21 to 28 wt % of a difunctional acrylated, aromatic polyurethane; 11 to 18 wt % of (2-hydroxypropyl) acrylate or methacrylate; 1 to 4 wt % of one or more photoinitiators; 50 to 65 wt % of one or more mineral fillers; 1 to 2.5 wt. % of an $SiO_2$-containing thixotropizing agent; and 1 to 1.5 wt % of an organic peroxide.

6. The adhesive composition according to claim 1, comprising: 23 to 26 wt % of a difunctional acrylated, aromatic polyurethane; 13 to 16 wt % of (2-hydroxypropyl) acrylate or methacrylate; 2 to 3 wt % of one or more photoinitiators; 52 to 60 wt % of one or more mineral fillers; 1 to 2 wt. % of an $SiO_2$-containing thixotropizing agent; and 1 to 1.5 wt % of an organic peroxide.

7. The adhesive composition according to claim 1, wherein the spacers are made of metal, plastic, glass, ceramic, or a mixture thereof.

8. The adhesive composition according to claim 1, wherein the spacers have a diameter of 10 to 100 μm.

9. The adhesive composition according to claim 8, wherein the spacers have a diameter of 20 to 40 μm.

10. The adhesive composition according to claim 1, wherein the mineral filler has a particle size less than 100 μm.

11. The adhesive composition according to claim 10, wherein the mineral filler has a particle size of 1 to 20 μm.

12. A radiation—and/or heat-curable adhesive composition having high thermal conductivity, comprising: 23 to 26 wt % of a difunctional acrylated, aromatic polyurethane; 13 to 16 wt % of (2-hydroxypropyl) acrylate or methacrylate; 2 to 3 wt % of one or more photoinitiators; 52 to 60 wt % of one or more mineral fillers; 1 to 2 wt. % of an $SiO_2$-containing thixotropizing agent; and 1 to 1.5 wt % of an organic peroxide.

13. A method of bonding electronic components or circuits to heat sinks comprising the step of applying an adhesive composition having high thermal conductivity; 19 to 40 wt % of a difunctional acrylated, aromatic polyurethane; 9 to 25 wt % of (2-hydroxypropyl) acrylate or methacrylate; 1 to 5 wt % of one or more photoinitiators; 35 to 70 wt % of one or more mineral fillers; 0.5 to 3 wt. % of an $SiO_2$-containing thixotropizing agent; 0.5 to 2 wt % of an organic peroxide; and spherical spacers.

\* \* \* \* \*